United States Patent [19]
Shigeeda et al.

[11] Patent Number: 5,900,948
[45] Date of Patent: * May 4, 1999

[54] IMAGE PROCESSING APPARATUS AND METHOD

[75] Inventors: Nobuyuki Shigeeda, Yokohama; Yoshihiro Ishida, Kawasaki, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/575,578

[22] Filed: Dec. 20, 1995

[30] Foreign Application Priority Data

Dec. 21, 1994 [JP] Japan ................................ 6-318055

[51] Int. Cl.$^6$ ........................ H04N 1/40; G06K 9/48
[52] U.S. Cl. ...................... 358/448; 358/447; 358/462; 382/197
[58] Field of Search ...................... 358/448, 450, 358/453, 447, 445, 456, 455, 534, 462, 465, 466, 467; 382/176, 196, 197, 199, 266, 268, 270, 298

[56] References Cited

U.S. PATENT DOCUMENTS

| | | | |
|---|---|---|---|
| 5,134,667 | 7/1992 | Suzuki | 382/22 |
| 5,206,719 | 4/1993 | Ikeda et al. | 358/515 |
| 5,515,179 | 5/1996 | Yamakawa et al. | 358/447 |
| 5,566,003 | 10/1996 | Hara et al. | 358/448 |
| 5,579,405 | 11/1996 | Ishida et al. | 382/197 |
| 5,644,366 | 7/1997 | Ushida et al. | 358/462 |
| 5,757,961 | 5/1998 | Tamakawa et al. | 382/197 |

FOREIGN PATENT DOCUMENTS

| | | | |
|---|---|---|---|
| 4157578 | 5/1992 | Japan | G06F 15/70 |
| 5174140 | 7/1993 | Japan | G06F 15/66 |
| 5342340 | 12/1993 | Japan | G06F 15/66 |
| 6318248 | 11/1994 | Japan | G06F 15/66 |
| 6337930 | 12/1994 | Japan | G06F 15/66 |

*Primary Examiner*—Edward L. Coles
*Assistant Examiner*—Madeleine AV Nguyen
*Attorney, Agent, or Firm*—Fitzpatrick, Cella, Harper & Scinto

[57] ABSTRACT

There are provided an image processing apparatus and method, which are excellent in speed, quality, and memory amount by appropriately switching a portion to be subjected to extraction of outline vector data and a portion not to be subjected to such extraction on the basis of an input binary image.

For example, whether an input binary image is a character/line image region or a pseudo halftone image region is roughly discriminated in units of predetermined amounts. Only image data determined as character/line image regions is extracted, and outline vector data are extracted from the extracted image data. The extracted outline vector data are stored in a memory. The amount of data stored in the memory is monitored, and when it is determined that the amount of vector data is too large as compared to a given image amount, and the memory overflows, vector smoothing processing including variable magnification processing for a region of interest is suspended, and a binary image subjected to binary SPC processing is selected.

16 Claims, 8 Drawing Sheets

IMAGE PROCESSING APPARATUS AND METHOD

BACKGROUND OF THE INVENTION

The present invention relates to an image processing apparatus and method and, more particularly, to an image processing apparatus and method for converting a binary image and outputting the converted image.

More specifically, the present invention relates to a technique for performing smoothing processing of a binary image on the basis of outline vector information extracted from an outline portion of a binary image obtained in outline smoothing processing of an original image.

The image processing technique according to the present invention can be applied to a resolution conversion technique and a bit-map image smoothing technique in OA equipment such as an electronic file apparatus, a facsimile apparatus, and the like.

The image processing technique according to the present invention can be applied to a resolution conversion technique and smoothing technique in multimedia image processing.

As a conventional resolution conversion technique of a digital binary image in, e.g., a facsimile apparatus, an SPC (Selective Processing Conversion) method, a projection method, and the like have been proposed and used.

The SPC method is a technique for attaining resolution conversion by repetitively using or periodically thinning out certain pixels of an original image a plurality of number of times corresponding to the variable magnification factor of an image (see Matsumoto & Kobayashi, "Examination of Image Quality Evaluation in Facsimile Resolution Conversion", Journal of Image Electronics, Vol. 12, No. 5, pp. 354–362, 1983).

The projection method is a technique for determining the pixel values of a converted image by projecting an original image onto a conversion image surface having a different line density, and binarizing the integrated values of corresponding pixels in the surface on the basis of the threshold value theory (see Arai & Yasuda, "Examination of Facsimile Line Density Conversion", Journal of Image Electronics, Vol. 7, No. 1, pp. 11–18, 1978).

Furthermore, as the resolution conversion and smoothing technique of a binary image, a smoothing technique which refers to a pixel pattern around the pixel of interest (Imanaka et al., "High-image Quality Conversion of Facsimile Received Image by Smoothing Processing", Preparatory Manuscript for Annual Conference of Society of Image Electronics, No. 18, 1991), or the like has been proposed, and is used in a facsimile apparatus, an electronic file, and various peripheral devices.

However, the resolution conversion method cannot avoid deterioration of image quality since a curved portion of an image becomes a stepwise (zigzag) pattern upon conversion with a large variable magnification factor. On the other hand, the resolution conversion and smoothing technique which refers to a pixel pattern around the pixel of interest can only cope with fixed variable magnification factors such as ×2, ×4, and the like of the pixel of interest in the main scanning and sub-scanning directions of an image.

In order to solve the above-mentioned problems, an outline smoothing method for extracting the outline of a black image (when a binary image is defined by white or black pixels) as vector data (to be referred to as "outline vector data" hereinafter) in place of directly processing a binary image in a bit-map format, and performs subsequent processing operations such as variable magnification processing, smoothing processing, and the like for the outline vector data so as to obtain a high-quality image (to be referred to as "outline processing" hereinafter), has been proposed (see Japanese Patent Application No. 3-345062).

When outline vector data is defined by the coordinate data of start and end points, the variable magnification processing can be attained in accordance with the variable magnification factor of the coordinate data. When outline vector data is defined by a difference value (length) of vectors (Japanese Patent Application No. 4-152461), the coordinate values of the origin of a vector loop can be multiplied with the variable magnification factor, and the respective vector difference values can be enlarged/reduced in accordance with the variable magnification factor. Furthermore, the smoothing processing such as isolated point/notch removal, jaggy (zigzag pattern) smoothing, and the like is attained by re-defining outline vectors by pattern matching using, as elements, the lengths and directions of outline vectors near the vector of interest with respect to the vector of interest, to be subjected to smoothing processing, of extracted vectors.

When a processing image includes a pseudo halftone image such as a picture which is not suitable for outline processing, a pseudo halftone region and a character/line image region in the image are discriminated in advance by region discrimination of a binary image, and a final image is synthesized by selecting pixels obtained by the outline smoothing method for the character/line image region, and pixels obtained by the above-mentioned SPC method for the pseudo halftone region, thereby realizing high-image quality resolution conversion.

On the other hand, a method of reducing the memory capacity required for processing and shortening the processing time by executing the outline smoothing method in units of image blocks of a predetermined amount expressed in units of lines in a binary image, e.g., in a stripe pattern (to be referred to as "stripe processing" hereinafter), has been proposed.

When the outline smoothing method is used, a resolution conversion of an image with relatively high quality, which cannot be obtained by the conventional method, can be realized within an arbitrary variable magnification factor range from a small magnification factor to a large magnification factor.

On the other hand, when the conventional outline smoothing processing is executed, a very large number of outline vectors are extracted depending on processing images, and processing such as smoothing processing, binary image reproduction processing, and the like must be performed for a large amount of outline vector data. For this reason, a work memory for storing vector data during processing must have a very large capacity, resulting in a large disadvantage in terms of cost.

Furthermore, it is difficult to integrate a large-capacity memory on an LSI. Even when a system for externally connecting a large-capacity memory to an LSI (e.g., a secondary memory such as a hard disk device) is used, the time required for memory accesses is prolonged, resulting in a low processing speed as a whole.

On the other hand, the work memory can be reduced by the method of dividing an image into stripe patterns and executing processing in units of stripes. However, this method is not necessarily satisfactory, either.

SUMMARY OF THE INVENTION

It is an object of the present invention to provide an image processing apparatus and method, which are excellent in speed, quality, and memory amount by appropriately switching a portion to be subjected to extraction of outline vector data and a portion not to be subjected to extraction of outline vector data on the basis of an input binary image upon variable magnification processing of the binary image.

It is another object of the present invention to provide an image processing apparatus and method, which can obtain an enlarged/reduced binary image with high quality without causing any problem in a normal state, and can generate an image which can suppress a decrease in processing speed and a decrease in quality depending on the state of an input binary image.

According to one aspect of the present invention, first, it is an object to provide an image processing apparatus and method which can execute high-image quality resolution conversion, which adopts the outline smoothing method, using a relatively small-capacity large memory which is inexpensive and can be integrated on an LSI independently of the type of image and without interrupting processing in progress.

According to another aspect of the present invention, it is an object to provide means for storing and holding outline vector data output from outline vector extraction means in an initial stage of the outline smoothing processing.

According to still another aspect of the present invention, it is an object to provide means for storing and holding outline vector data required for first smoothing processing in a middle stage of the outline smoothing processing, and to provide the transfer timing of outline vector data to first smoothing means.

According to still another aspect of the present invention, it is an object to provide means for preventing interruption of processing due to the absence of an empty space of a memory upon storage of outline vector data extracted in the outline smoothing processing in the memory.

According to still another aspect of the present invention, it is an object to prevent image processing from being interrupted when a memory for storing and holding outline vector data obtained by outline vector extraction becomes full of data, and can no longer store data.

According to still another aspect of the present invention, it is an object to provide means for predicting that the vector memory will become full of data soon so as to prevent image processing from being interrupted when the memory for storing and holding outline vector data obtained by outline vector extraction becomes full of data, and can no longer store data.

Furthermore, according to still another aspect of the present invention, it is an object to provide a detailed circuit arrangement for detecting that the vector memory will become full of data soon.

According to still another aspect of the present invention, it is an object to control the subsequent outline vector extraction not to perform an extra operation, when it is predicted that the vector memory will become full of data soon, so as to prevent image processing from being interrupted when the memory for storing and holding outline vector data obtained by outline vector extraction becomes full of data, and can no longer store data.

According to still another aspect of the present invention, it is an object to control to adopt another resolution conversion means in place of the subsequent outline smoothing processing, when it is predicted that the vector memory will become full of data soon, so as to prevent image processing from being interrupted when the memory for storing and holding outline vector data obtained by outline vector extraction becomes full of data, and can no longer store data.

According to still another aspect of the present invention, it is an object to provide detailed means for adopting another resolution conversion means in place of the subsequent outline smoothing processing, when it is predicted that the vector memory will become full of data soon, so as to prevent image processing from being interrupted when the memory for storing and holding outline vector data obtained by outline vector extraction becomes full of data, and can no longer store data.

According to still another aspect of the present invention, it is an object to adjust the time required for the outline smoothing processing to catch up with the processing speed of an external output device by switching resolution conversion processing to another processing that replaces the outline smoothing processing, when the external output device has a high image output speed, and the time required for the outline smoothing processing is long and cannot catch up with the output operation.

According to still another aspect of the present invention, it is an object to adjust the time required for the outline smoothing processing to catch up with the processing speed of an external output device by switching resolution conversion processing to another processing that replaces the outline smoothing processing, when the external output device has a high image output speed, and the time required for the outline smoothing processing is long and cannot catch up with the output operation, to provide means for temporarily storing binary image output in binary image reproduction processing executed in the final stage of the outline smoothing processing, and to provide means for measuring the time required for outline smoothing processing.

According to still another aspect of the present invention, it is an object to provide means for switching resolution conversion processing to another processing that replaces the outline smoothing processing, when the external output device has a high image output speed, and the time required for the outline smoothing processing is long and cannot catch up with the output operation.

According to still another aspect of the present invention, when the external output device has a high image output speed, and the time required for the outline smoothing processing is long and cannot catch up with the output operation, the resolution conversion processing is switched to another processing that replaces the outline smoothing processing. In this case, it is an object to provide detailed means as the other processing.

According to still another aspect of the present invention, when the external output device has a high image output speed, and the time required for the outline smoothing processing is long and cannot catch up with the output operation, the resolution conversion processing is switched to another processing that replaces the outline smoothing processing. In this case, it is an object to provide detailed means as the switching means.

According to still another aspect of the present invention, it is an object to process an image in units of image blocks each constituted in units of lines of the image since the image processing mode of a high-image quality resolution conversion device using the outline smoothing processing is not always limited to processing for processing the entire image at one time so as to reduce the memory required for the apparatus and to improve the processing speed.

Other objects and effects of the present invention will become easily understood from the following description.

An image processing apparatus which can achieve the above objects comprises, e.g., the following arrangement. More specifically, the apparatus comprises:

input means for inputting a binary image;

extraction means for extracting outline vectors from the input binary image;

monitoring means for monitoring an operation amount of the extraction means; and output means for, when the monitoring means detects that the operation amount of the extraction means exceeds a predetermined amount, outputting an enlarged/reduced binary image without extracting the outline vectors from the input binary image.

Also, the image processing apparatus comprises the following arrangement. More specifically, an image processing apparatus for receiving a binary image, performing variable magnification processing of the binary image, and outputting the processed image, comprises:

first binary image generation means for generating an enlarged/reduced binary image without extracting outline vectors from the input binary image data;

discrimination means for discriminating whether a region of interest in the binary image is a character/line image region or a pseudo halftone image region;

extraction means for extracting outline vectors from the input binary image data;

second binary image generation means for generating a binary image by enlarging/reducing the extracted outline vector data;

selection means for selecting the binary image from one of the first and second binary image generation means in accordance with a discrimination result of the discrimination means, and outputting the selected binary image; and monitoring means for monitoring an operation amount of the extraction means, wherein the selection means selects and outputs the image generated by the first binary image generation means when the monitoring means detects that the operation amount of the extraction means exceeds a predetermined amount.

According to the above-mentioned arrangement of the present invention, an image processing apparatus and method, which are excellent in speed, quality, and memory amount can be provided by appropriately switching a portion to be subjected to extraction of outline vector data and a portion not to be subjected to extraction of outline vector data on the basis of an input binary image.

Also, according to another invention, an image processing apparatus and method, which can obtain an enlarged/reduced binary image with high quality without causing any problem in a normal state, and can generate an image which can suppress a decrease in processing speed and a decrease in quality depending on the state of an input binary image, can be provided.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

<First Embodiment>

Figure 1:
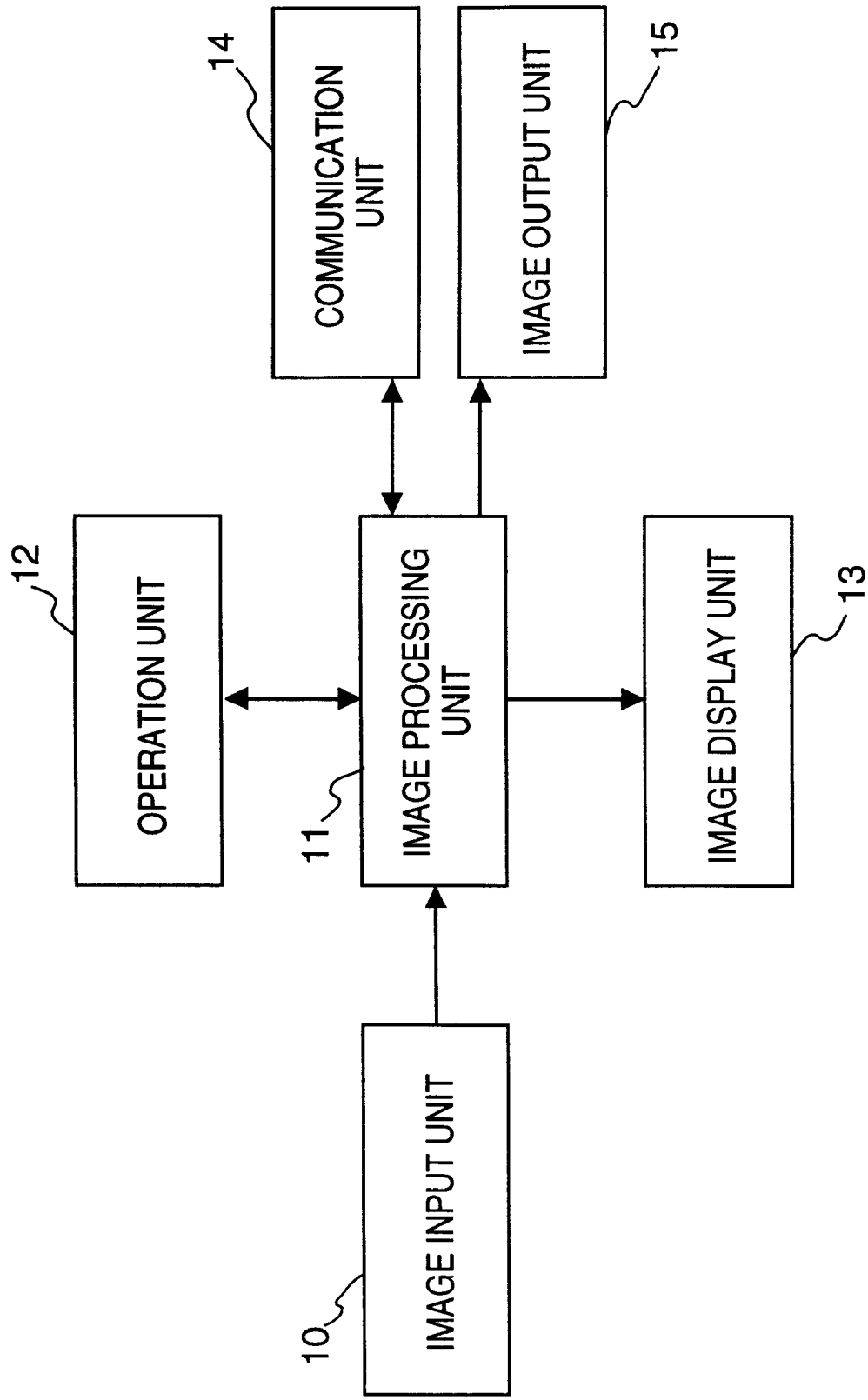
FIG. 1 is a schematic block diagram showing the arrangement of an image processing apparatus according to the first embodiment of the present invention.

FIG. 1 is a block diagram showing the arrangement of an image processing apparatus according to the first embodiment. Referring to FIG. 1, reference numeral 10 denotes an image input unit such as an image scanner for inputting binary image data in a bit-map format by a raster scanning method; 11, an image processing unit for performing various kinds of image processing including variable magnification processing as the feature of this embodiment; 12, an operation unit such as an operation panel, which allows an operator to perform a command input operation, and informs the operator of the state of the image processing apparatus; 13, an image display unit such as a CRT for displaying image data; 14, a communication unit for transmitting/receiving image data to/from an external device via an I/F; and 15, an image output unit such as a printer for outputting image data onto a recording medium. Note that image data can be input by receiving binary image data, which is transmitted from the external device via a communication line, by the communication unit.14

Figure 2:
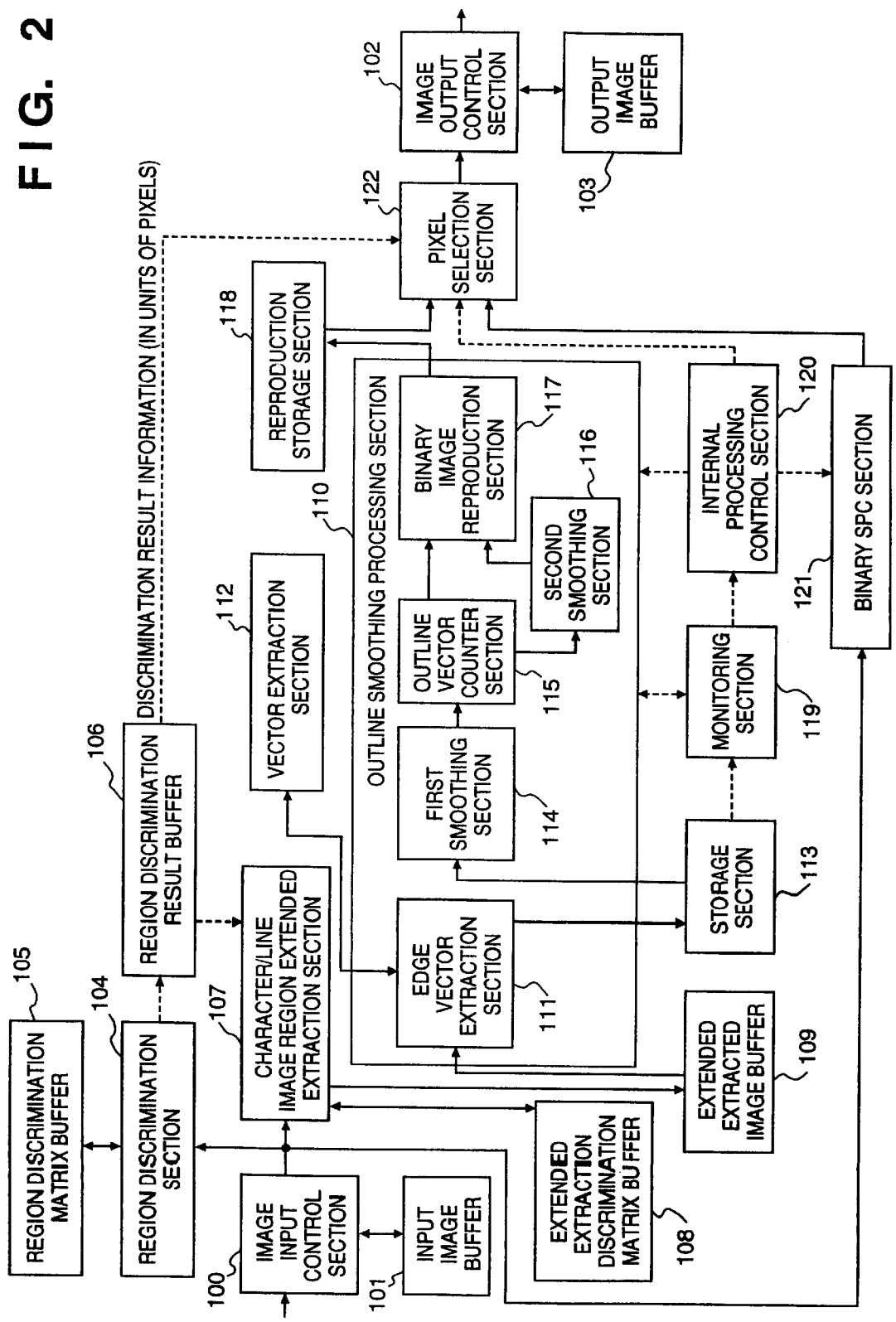
FIG. 2 is a block diagram showing the detailed arrangement of an image processing unit in the first embodiment.

FIG. 2 is a block diagram showing the detailed arrangement for, in particular, realizing the variable magnification processing in the above-mentioned image processing unit 11.

Referring to FIG. 2, reference numeral 100 denotes an image input control section for controlling the input operation of binary image data input from the image input unit 10 or the communication unit 14 to the image processing unit 11.

The image input control section 100 is connected to an input image buffer 101 for temporarily holding a non-processed input image, and an image is appropriately read out from the buffer 101 via the image input control section 100 in correspondence with the processing states of the subsequent outline processing, an SPC section, and the like. Note that the input image is not only the entire image for one page but also an image divided into stripe patterns in consideration of the memory capacity or the processing speed. The present applicant also has pending applications for the invention associated with outline processing of an image divided into stripe patterns in Japanese Patent Application Nos. 05-106643 and 05-126319.

Reference numeral 102 denotes an image output control section for controlling the output operation of a binary image enlarged/reduced by the image processing unit 11 to the image output unit 15, the image display unit 13, the communication unit 14, or the like.

The image output control section 102 is connected to an output image buffer 103 for temporarily holding a processed output image. For example, when a device such as a laser beam printer for outputting an image in units of blocks is connected as the image output unit 15, the buffer 103 is used as an area for temporarily storing the processed image.

Reference numeral 104 denotes a region discrimination section for discriminating whether pixels constituting an input image belong to a pseudo halftone region or a character/line image region. The region discrimination section 104 is directly connected to the image input control section 100, and discriminates a region to which the pixel of interest belongs by referring to the pixel values of surrounding pixels since it considers the pixel of interest in an input binary image as a group of the pixel of interest and pixels surrounding the pixel of interest, i.e., as a matrix. A region discrimination buffer 105 is connected to the region discrimination section 104, and is used in region discrimination of pixels. Discrimination results are output in units of pixels, and are temporarily stored in a region discrimination result buffer 106. Thus, the timings of the subsequent processing operations can be adjusted.

Reference numeral 107 denotes a character/line image region extended extraction section. In general, the number of outline vectors extracted in the outline smoothing processing depends on the type of image, and tends to increase as an image is closer to a pseudo halftone image. This means that a very large memory capacity is required upon execution of the outline smoothing processing.

The character/line image extended extraction section 107 coarsely extracts a character/line image region image to be subjected to the outline smoothing processing in advance to suppress the number of outline vectors extracted in the outline processing, thus realizing processing for removing an image which is clearly determined as a pseudo halftone region image.

The character/line image extended extraction section 107 is connected to the region discrimination result buffer 106, and discriminates by referring to the region discrimination results of a matrix of pixels surrounding the pixel of interest if the pixel of interest is to be extracted. An extended extraction discrimination matrix buffer 108 is connected to the character/line image extended extraction section 107, and the above-mentioned discrimination is performed using this matrix buffer 108.

The output from the character/line image extended extraction section 107 is stored in an extended extracted image buffer 109 as extended extracted image data. Furthermore, the extended extracted image buffer 109 is connected to an outline smoothing processing section 110. When a predetermined amount of data is stored in the buffer 109, binary image data is read out from the buffer 109, and the outline processing is started.

Note that the extended extracted image buffer 109 stores an image until outline vector extraction (to be described later) can be started. Therefore, the capacity of this buffer depends on the size of a matrix window in an outline vector extraction section 111. For example, when the window size corresponds to a 2×2 matrix, a line buffer for two lines need only be arranged; when the window size corresponds to a 3×3 matrix, a line buffer for three lines need only be arranged.

Note that the input image is not limited to processing for processing the entire image at one time. For example, processing may be performed in units of image blocks each having a predetermined amount expressed in units of lines in a binary image.

The outline smoothing processing section 110 comprises the following constituting elements.

Reference numeral 111 denotes an outline vector extraction section. In this embodiment, an outline line located at the boundary between black and white images is extracted as outline vector data on the basis of block images stored in the extended extracted image buffer 109. In the outline vector extraction, outline coordinate data constituting vectors and connection information of the outline coordinate data are extracted while raster-scanning the matrix window having a predetermined size. When an outline vector is connected to an image region which is not raster-scanned yet, the connection information of the outline coordinate data of interest is temporarily stored in a vector extraction buffer 112, and thereafter, is used for retrieving the connection destination. When the connection destination is found as a result of the subsequent raster scanning, the connection information corresponding to the above-mentioned outline coordinate data is determined. The determined outline vector data (consisting of an outline vector and connection information) is stored in a storage section 113.

The boundary (between black and white pixels) of an image, i.e., an outline line always forms a closed loop independently of the type of image. The outline vector data output from the outline vector extraction section 111 always form one closed loop when their connection information is traced. Therefore, vectors extracted from an image block become a set of outline vector loops, i.e., a plurality of outline vector loops. The storage section 113 stores outline vector data having such a feature.

Note that the outline vector extraction section 111 is a section including vector extraction by raster-scanning the matrix window, and various sections such as the scanning pattern of the matrix window may be proposed. As an existing one of these techniques, please refer to Japanese Patent Application No. 02-281958.

The storage section 113 has a double-plane buffer structure. More specifically, outline vector data extracted from one image block are stored in the first plane, and outline vector data extracted from the next image block are subsequently stored in the second plane. During the storage (writing) of outline vector data in one plane by the outline vector extraction section 111, data can be read out from the other plane, and the readout data is output to a first smoothing section 114 (the first smoothing section 114 reads out the data). When the first smoothing processing is completed, and the buffer area of the first plane becomes empty, the first smoothing processing is subsequently performed for outline vector data stored in the second plane.

The reason why the storage section 113 has the double-plane buffer structure is to match the data processing timings between the character/line image region extended extraction processing and outline vector extraction processing, which allow processing in units of pixels or outline vectors, and the first smoothing processing which requires processing in units of image blocks, and to improve the processing speed by pipeline processing.

Note that the storage section 113 is connected to a monitoring section 119 according to the present invention. The monitoring section 119 has a mechanism for detecting that the storage section 113 can no longer store and hold vector data, and generating a detection signal when the storage section 113 becomes full of data during the storage operation and continues to store another vector data.

Furthermore, the monitoring section 119 is connected to an internal processing control section 120. The internal processing control section 120 is connected to a binary SPC section 121, a pixel selection section 122, and the outline smoothing processing section 110. The internal processing control section 120 outputs internal control signals in the respective sections upon reception of the detection signal from the monitoring section 119.

More specifically, upon reception of the detection signal from the monitoring section 119, the internal processing control section 120 outputs a control signal to the outline smoothing processing section 110 to suspend the outline vector extraction which is being executed. At the same time, the section 120 outputs a control signal to the binary SPC section 121 to start binary SPC processing in turn from an image block associated with the suspended outline smoothing processing. Furthermore, the section 120 outputs a control signal to the pixel selection section 122 to forcibly select the output data from the binary SPC section 121 independently of the value of the discrimination result information stored in the region discrimination result buffer 106.

As a result of this control, the outline smoothing processing for an image which has an extremely large vector amount to be extracted in the initial stage of the outline smoothing processing is suspended and switched to simple variable magnification processing based on the binary SPC method, thus outputting an image processed based on the binary SPC method. Therefore, resolution conversion can be prevented from being suspended due to suspension of the outline smoothing processing even when a large-capacity memory is not prepared in the storage section 113.

In this case, upon reception of the suspension instruction of the outline vector extraction processing from a given image block under the control of the internal processing control section 120, the outline vector extraction section 111 starts outline vector extraction from the next image block held in the extended extracted image buffer 109. New outline vector data extracted from the next image block are stored and held in the storage section 113.

With the above-mentioned arrangement with the mechanism using the monitoring section 119 and the internal processing control section 120 according to the present invention, the storage section 113 need not comprise a large-capacity vector buffer to cope with a complicated image (an image having an extremely large outline vector amount to be extracted) which is rarely input. This allows the memory serving as the vector buffer to be integrated on an LSI, and leads to an economical advantage.

Since the outline smoothing processing is performed in units of image blocks, the required capacity of the vector buffer varies depending on the size of an image block to be processed. In this case, needless to say, the size of the image block and the capacity of the vector buffer, i.e., the storage section are determined in advance in consideration of the vector amount to be extracted from a normal image.

Referring back to FIG. 2, reference numeral 114 denotes a first smoothing section in the outline smoothing processing. Extracted outline vector data are smoothed by re-defining outline vectors by vector pattern matching with reference to the storage section 113. With this process, a zigzag pattern which is often observed in an oblique outline line is smoothed, and notches caused by noise components mixed during a scanner reading operation or a facsimile communication can be removed. Although a zigzag pattern is defined by a large number of vectors, it is re-defined by one or several vectors after smoothing, thus reducing the data amount. Note that various methods have been proposed in association with smoothing. For example, a smoothing technique described in Japanese Patent Application No. 03-345062 may be used.

Although not specifically shown, the first smoothing section 114 has a mechanism for enlarging/reducing data to an arbitrary magnification factor after smoothing processing. More specifically, the first smoothing section 114 can easily attain variable magnification processing by multiplying smoothed outline vector data with an arbitrary variable magnification factor.

Reference numeral 115 denotes an outline vector counter section for counting the number of outline vectors per vector loop. In general, a small image (an image with a small vector loop) like a pseudo halftone image has a relatively small number of outline vectors constituting one vector loop, while a character/line image has a relatively large number of outline vectors constituting one vector loop. On the other hand, when a small image is subjected to smoothing processing, the density value of a pseudo halftone portion changes, and image quality may deteriorate after resolution conversion. In view of this problem, in this embodiment, the outline vector counter section 115 counts the number of outline vectors constituting one vector loop, and whether or not the smoothing processing in a second smoothing section 116 (to be described later) is performed is selected in accordance with the counted number of vectors.

Since the character/line image region extended extraction section 107 is applied to an original image, an image region corresponding to a pseudo halftone region is not input as an image to be subjected to the outline smoothing processing. However, the region discrimination result used in the character/line image region extended extraction section 107 is not always perfect, and may include a discrimination error. An erroneously discriminated image region is subjected to the outline smoothing processing even if it is a pseudo halftone region. In view of this problem, in this embodiment, in order to use satisfactory outline smoothing processing even for such a pseudo halftone image input due to the discrimination error, the outline vector counter section 115 is arranged to realize a double-checking mechanism.

Note that a reference number of outline vectors to be used in the outline vector counter unit 115 must be set to be a relatively small value. This is because most of images which are supplied to the outline smoothing processing section 110 due to the discrimination error of the region discrimination section are isolated points and small curves, and isolated points and small curves constituting such small images consist of outline vector loops each surrounded by a relatively small number of outline vectors. In this embodiment, the reference number of outline vectors is set to be about 32. However, the present invention is not particularly limited to this value, and this value may be changed in correspondence with the type or quality of image, and the resolution of an input image (for example, the reading resolution of a scanner when an image is input from the scanner).

When the counted number of vectors is smaller than the reference number, the outline vector counter section 115 determines that the outline vector loop of interest is an isolated point, a small curve, or the like constituting a pseudo halftone image, and the second smoothing processing of this image is not performed. On the other hand, when the counted number of vectors is larger than the reference number, it is determined that the outline vector loop of interest corresponds to another image region, and the second smoothing processing of this image is performed.

Reference numeral 116 denotes a second smoothing section. The first smoothing section 114 adopts smoothing processing based on pattern matching, while the second smoothing section 116 attains smoothing of an image by performing weighted mean processing for the outline vector coordinate data of interest and outline vector coordinate data before and after the coordinate data of interest. Also, the second smoothing section 116 performs smoothing processing in units of outline vector loops.

Reference numeral 117 denotes a binary image reproduction section for reproducing a binary image from outline vector data. As described above, outline vector data after the variable magnification processing and smoothing processing merely represent an outline portion of an image, which is assumed between black and white pixels, and do not form a binary image in this state. Thus, a binary image is reproduced by painting the interior of a vector loop constituted by outline vectors in black (replacing pixels inside the vector loop by black pixels).

When the number of outline vectors per vector loop counted by the above-mentioned outline vector counter section 115 is smaller than the reference value, it is determined that the outline vector loop of interest is an isolated point, small curve, or the like constituting a pseudo halftone image, and the outline vector loop of interest is directly supplied to the binary image reproduction section 117 without being subjected to the second smoothing processing in the second smoothing section 116.

Note that many binary image reproduction processing methods have been conventionally proposed. For example, a method disclosed in Japanese Patent Application No. 03-194258 is known.

The binary image reproduced by the binary image reproduction section 117 is temporarily stored and held in a reproduction storage section 118, and thereafter, is supplied to the pixel selection section 122 in units of pixels in synchronism with the binary SPC section 121.

The binary SPC section 121 operates parallel to the above-mentioned outline smoothing processing, and performs binarization processing in units of pixels for an image block stored in the input image buffer 101. Note that a block image supplied to the outline smoothing section 110 and a block image supplied to the binary SPC section 121 are the same image stored in the input image buffer 101.

Since the outline smoothing processing is performed in units of image blocks, and the binary SPC section 121 performs processing in units of pixels, they have different processing times. In view of this, synchronization is attained using a FIFO or a similar pixel storage section (not shown) immediately before the pixel selection section 122.

The pixel selection section 122 selects pixels in units of pixels from an image subjected to the outline smoothing processing and pixels subjected to the binary SPC processing on the basis of discrimination information stored in the region discrimination result buffer 106. When the discrimination result indicates a pixel belonging to a character/line image region, the section 122 selects a pixel from the outline smoothing processing section 110. On the other hand, when the discrimination result indicates a pixel belonging to a pseudo halftone region, the section 122 selects a pixel from the binary SPC section 121.

Note that the discrimination result is applied to pixels after the variable magnification processing (including both the outline processing and the SPC processing) of pixels constituting an input image (in the case of enlargement, a plurality of pixels may be present, and in the case of reduction, no corresponding pixel may be present). More specifically, the region discrimination result for one pixel is applied to a plurality of pixels after the variable magnification processing in correspondence with the variable magnification factor.

The pixel selection section 122 is connected to the internal processing control section 120, and adopts an arrangement for forcibly outputting output data from the binary SPC section 121 under the control of the internal processing control section 120. Their control processes are as described above.

Note that reference numeral 130 in FIG. 2 denotes a CPU, which systematically controls the respective sections in the image processing unit 11 in accordance with a control program stored in a ROM 131. Reference numeral 132 denotes a RAM which serves as a work area of the CPU 130.

Pixels selected by the pixel selection section 122 are sequentially stored in the image output buffer 103 via the image output control section 102. Thereafter, the pixels are transferred to an external image output peripheral device, e.g., a laser beam printer as the image output unit 15.

Figure 3:
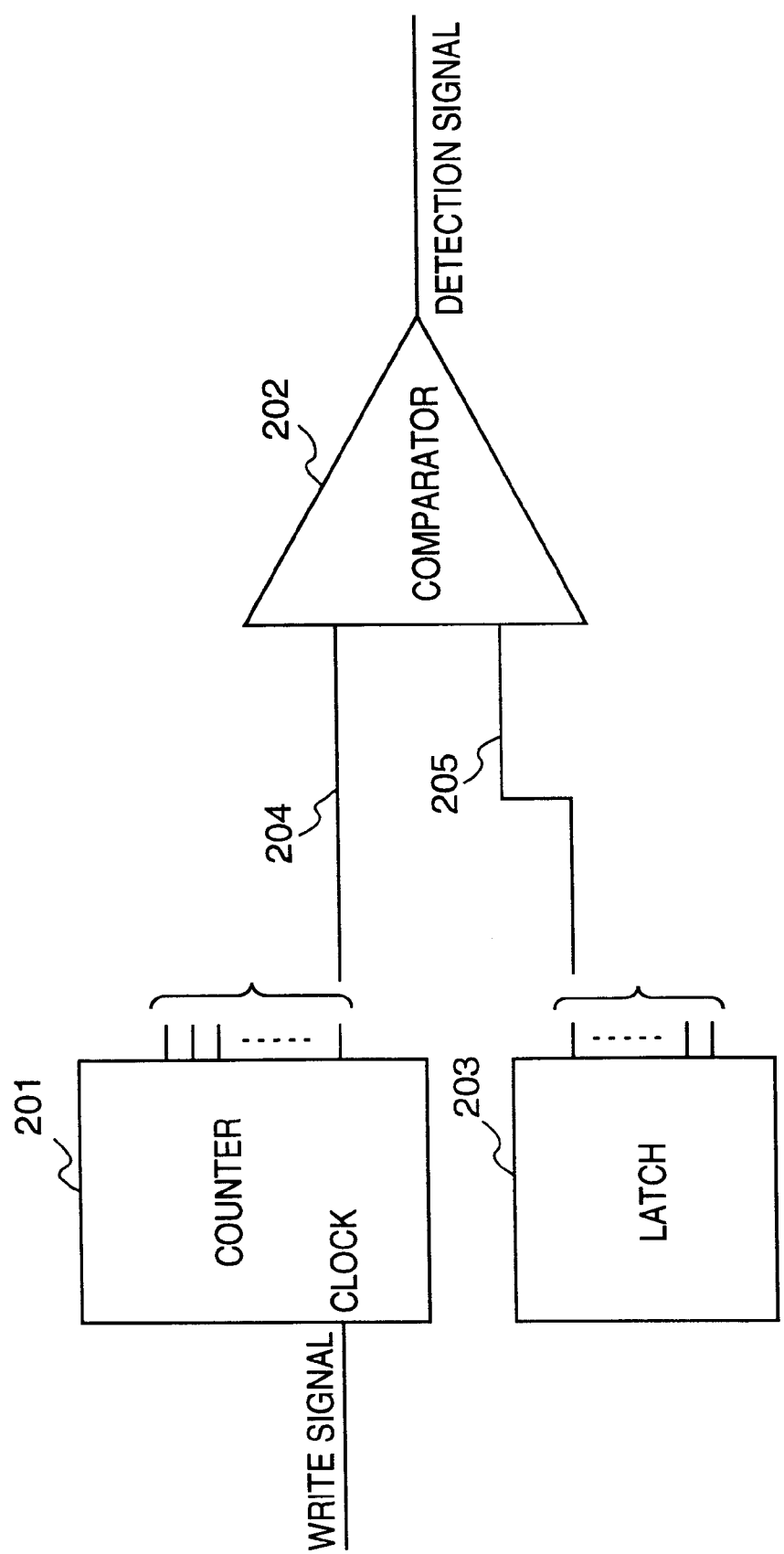
FIG. 3 is a block diagram showing the detailed arrangement of a monitoring unit in the first embodiment.

FIG. 3 shows the detailed arrangement of the monitoring section 119 of this embodiment. The monitoring section 119 will be described in more detail below.

As described above, the monitoring section 119 has a mechanism for detecting that the storage section 113 can no longer store and hold vector data, and generating a detection signal when the storage section 113 becomes full of data during the storage operation of outline vectors and continues to store another vector data.

Referring to FIG. 3, reference numeral 201 denotes a counter for directly monitoring the state of the storage section 113. A write signal of outline vector data to the storage section 113, i.e., the memory is interlocked with the memory address of data to be stored and held in the memory. Therefore, an empty area of the memory can be uniquely recognized by counting the number of times of increment of the memory address, i.e., the number of write signals. Therefore, the counter 201 may comprise, e.g., a conventional counter.

Reference numeral 202 denotes a comparator; and 203, a latch for pre-storing a predetermined value. The comparator 202 comprises, e.g., a conventional comparator circuit, and receives the count value from the above-mentioned counter 201. On the other hand, the latch 203 comprises a conventional latch circuit, and is preset with a predetermined value. Note that the predetermined value is a value calculated based on the above-mentioned memory address, and can be calculated from the capacity required for holding one outline vector data and the address space of the memory. Note that the memory capacity may often be increased (addition of memory modules). In view of this, the latch 203 preferably changes its stored value in place of storing a fixed value so as to cope with, e.g., a case wherein the apparatus of this embodiment is expected to be used in an environment that requires processing for a complicated image from the start.

The comparator 202 compares the output from the counter 201 and the data held in the latch 202, and generates a signal when the two values coincide with each other or when the count value exceeds the data value held in the latch 203. This signal is supplied to the internal processing control section 120 shown in FIG. 2 as a detection signal.

Note that reference numerals 204 and 205 denote bus lines for connecting the counter 201 and the latch 203 to the comparator 202. These bus lines have a bus width of several bits in correspondence with the count value or the value held in the latch 203.

Note that the comparator 202 is not limited to the conventional comparator circuit but may be constituted by a plurality of AND gates.

Figure 4:
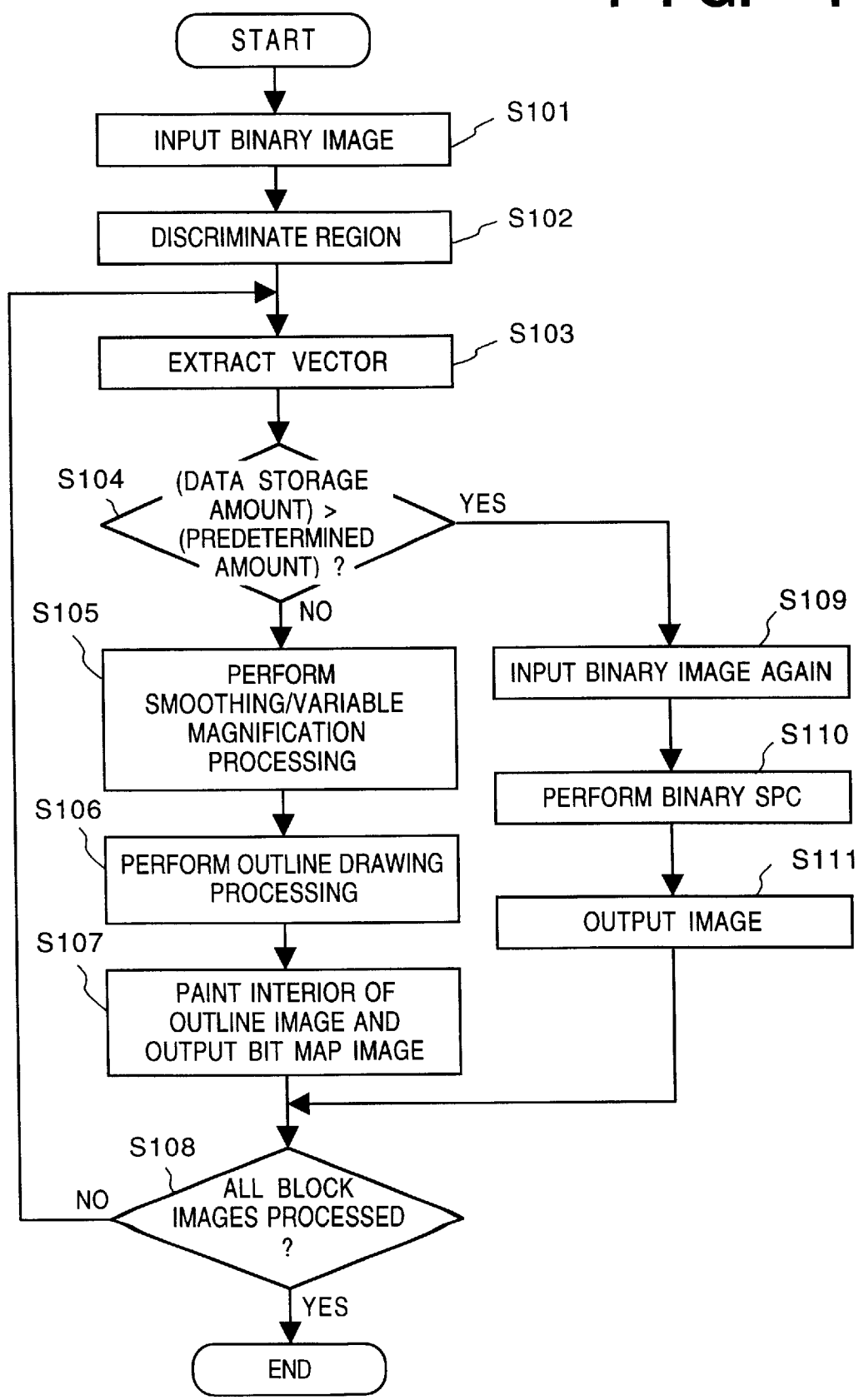
FIG. 4 is a flow chart showing variable magnification processing of the first embodiment.
Figure 5:
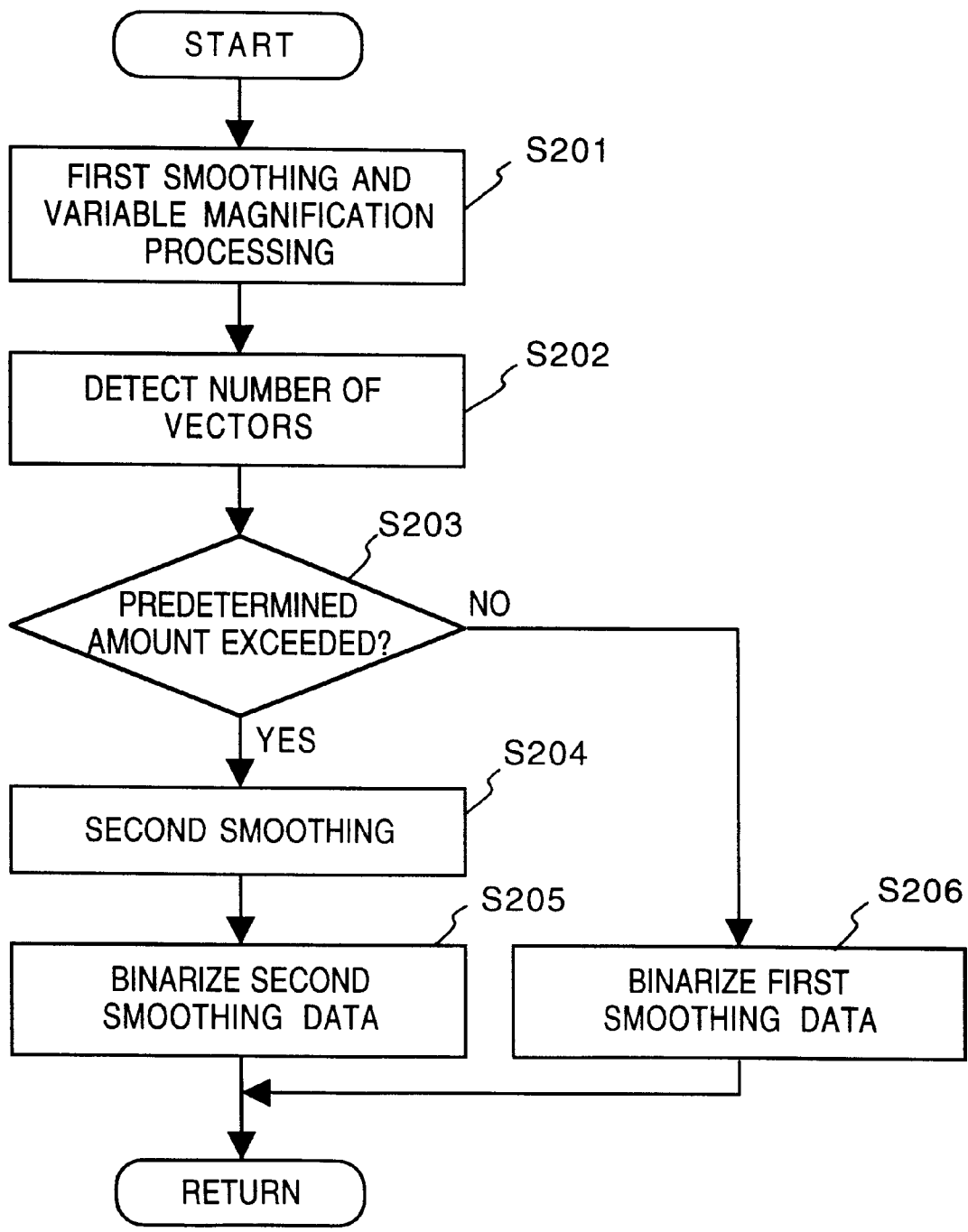
FIG. 5 is a flow chart showing in detail second variable magnification processing of the first embodiment.

FIG. 4 shows a variable magnification processing sequence for one image block according to this embodiment, and this sequence will be described below.

Step S101 is a step of inputting a binary image divided in units of blocks. Region discrimination for the input binary image is performed in step S102. The region discrimination is processing for discriminating a character/line image region from a pseudo halftone image region in the binary image. A white or black pixel pattern or a generation histogram is detected in, e.g., a 5×5 two-dimensional image matrix having a pixel of interest as its center to determine whether the region having the pixel of interest is a character/line image region or a pseudo halftone image region.

In step S103, a vector is extracted from the character/line image region on the basis of the result of region discrimination. On the other hand, variable magnification processing is applied to the pseudo halftone image by a separate binary SPC means (no flow is illustrated).

Vector data extracted by the above vector extraction is held in the storage section 113 in FIG. 2. At the same time, a predetermined amount of data, i.e., a storage amount is determined in step S104. If the data storage amount exceeds a preset predetermined amount in step S104, outline processing is interrupted for the current image block, and the flow advances to step S109. When the data storage amount is smaller than the predetermined amount, outline processing continues, and smoothing/variable magnification processing in step S105 is performed.

First smoothing processing, second smoothing processing, and variable magnification processing in the outline processing are appropriately performed in step S105. After smoothing/variable magnification processing is completed, the resultant image is subjected to outline drawing processing in step S106. The image is reproduced as a binary outline image constituted by only the outline portion of the image in accordance with the vector data.

The binary outline image is subjected to painting output processing in step S107, and the interior of the outline image is painted with black pixels to reproduce and output a binary bit map image.

Note that since processing is pipelined, it is determined in step S108 whether processing of all block images constituting the entire image is completed; if not, the flow returns to step S103 to continue processing.

As previously mentioned, when the extracted vector amount exceeds the predetermined amount in step S104, outline processing is interrupted, and the flow advances to step S109. Processing under this condition will be described below.

Block images to be processed are input again in step S109 because the storage section 113 in FIG. 2 overflows and outline processing is disabled for block images to be processed. In step S110, binary SPC processing is executed for the block images input again in step S109, and conventional variable magnification processing is applied. An image is output in step S111.

Note that after the image is output in step S111, the flow advances to step S108.

<Second Embodiment>

The second embodiment of the present invention will be described below.

In the first embodiment described above, the number of outline vectors extracted in the outline smoothing processing varies depending on the size of an input image, and hence, the capacity of the storage section required for storing and holding the extracted outline vectors changes. For this reason, the size of an input image block and the capacity of the storage section 113 must be determined in advance in consideration of the number of outline vectors expected to be extracted from a normal image. When the outline vector amount that can be stored and held in the storage section 113 exceeds an allowable amount, the monitoring section 119 detects this state, and the internal processing control section 120 switches the variable magnification processing in the outline smoothing processing section 110 to that in the binary SPC section 121.

In the second embodiment, the monitoring section 119 adopts another method in place of monitoring the storage section 113 so as to obtain the same effect as in the first embodiment and to solve the problem of a decrease in processing speed.

Since the arrangement of the image processing apparatus of the second embodiment is the same as that in the first embodiment, a detailed description thereof will be omitted.

In the second embodiment, the monitoring section 119 measures the time required for the outline smoothing processing of one image block, and generates a detection signal when the measured time exceeds a predetermined time. After the detection signal from the monitoring section 119 is supplied to the internal processing control section 120, control signals for automatically switching the resolution conversion processing from the outline smoothing processing to the binary SPC processing are generated, as described in the above embodiment. With these control signals, the outline smoothing processing section 110, the binary SPC section 121, and the pixel selection section 122 are controlled.

Note that the time required for the outline smoothing processing is a time required until one image block to be subjected to the outline smoothing processing section 110 is output via the outline vector extraction section 111, the smoothing sections 114 and 116, and the binary image reproduction section 117. This time depends on the type of image. For example, a simple image such as a character/line image can be processed within a short period of time, but as the image becomes more complicated, a longer time is required. This is because a complicated image has a larger number of outline vectors extracted by the outline vector extraction section 111.

The time measurement in the monitoring section 119 is attained using a conventional timer circuit. In order to detect the start and end timings of the outline smoothing processing for one image block, the monitoring section 119 is connected to the binary image reproduction section 117 of the outline smoothing processing section 110.

As described above, in the second embodiment, a character/line image which does not require a long processing time is subjected to the outline smoothing processing. Therefore, the storage section 113 need only have a capacity capable of storing and holding outline vectors that can be subjected to the outline smoothing processing within a predetermined period of time. In resolution conversion for a complicated image, since the binary SPC processing with a high processing speed is automatically selected and applied, this embodiment is particularly effective for a case wherein an external peripheral device such as a laser beam printer that requires a relatively high processing speed is connected.

Figure 6:
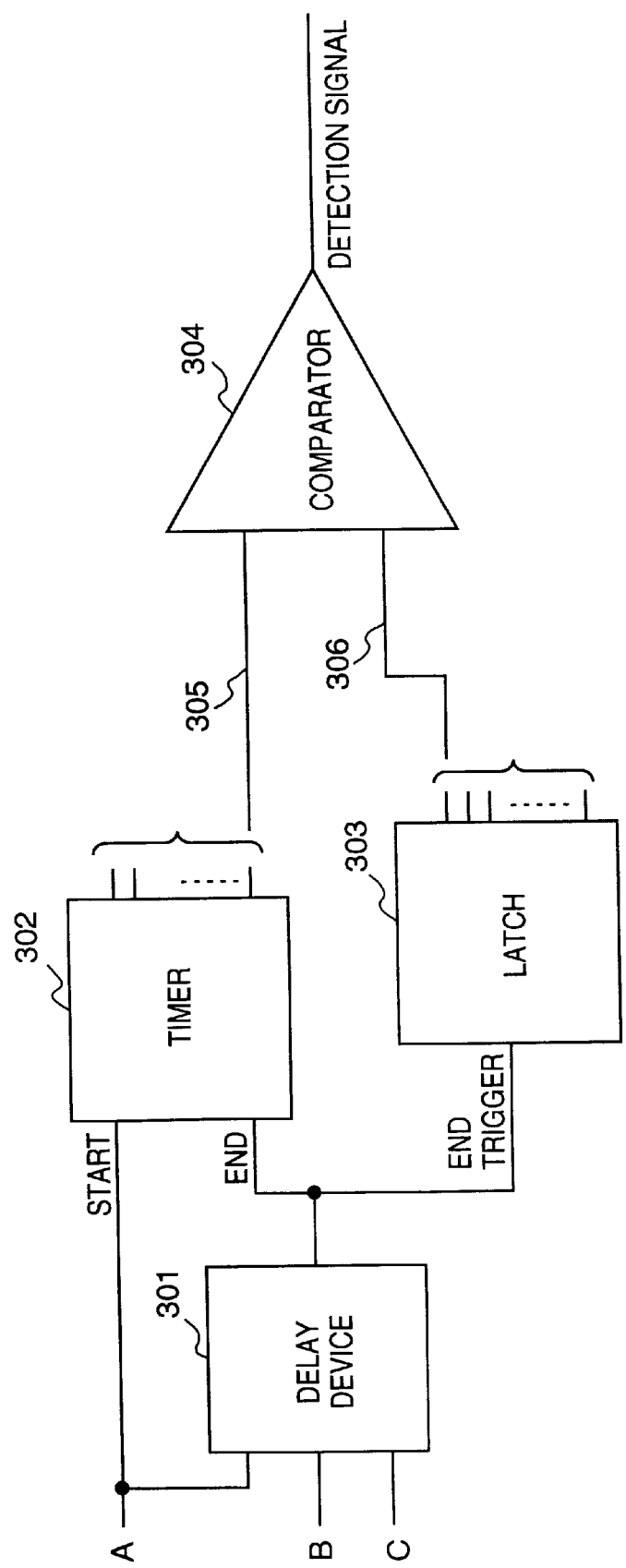
FIG. 6 is a block diagram showing the detailed arrangement of a monitoring unit according to the second embodiment of the present invention.

FIG. 6 shows the detailed arrangement of the monitoring section 119 of the second embodiment, and the monitoring section 119 will be described below.

Figure 7:
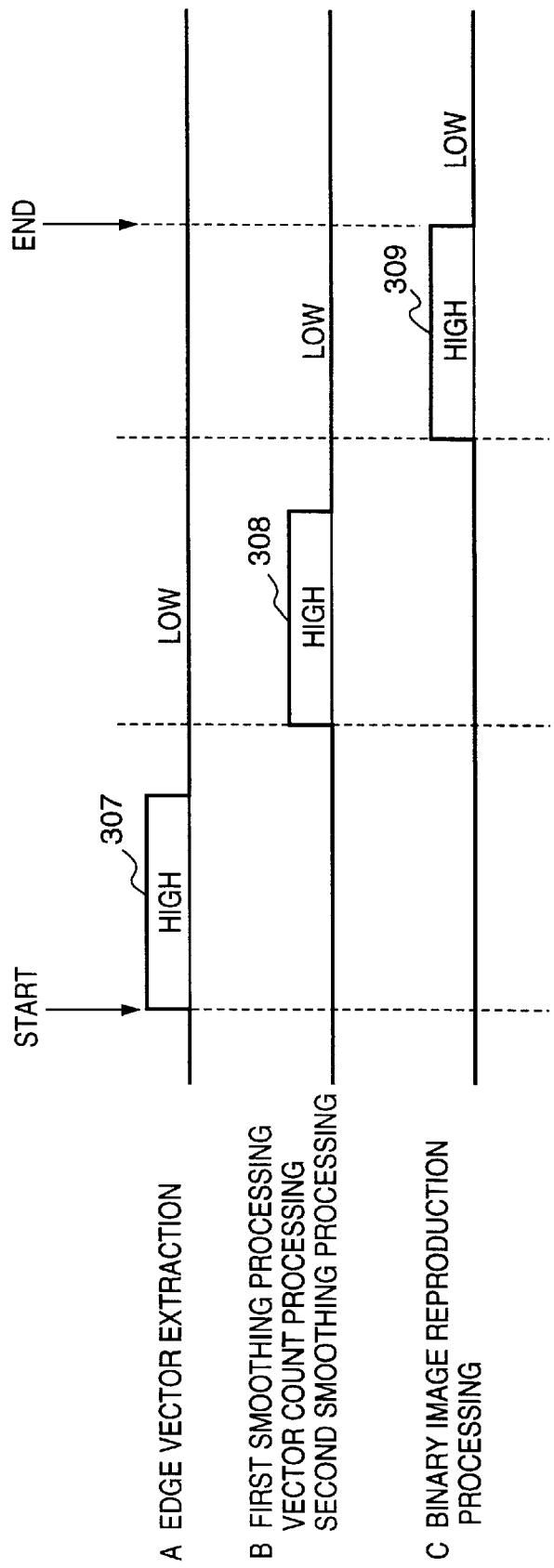
FIG. 7 is a timing chart of respective signals shown in FIG. 6.

Referring to FIG. 6, reference symbol A denotes a timing signal indicating the operation timing of the outline vector extraction section 111 shown in FIG. 2. Reference symbol B denotes a timing signal indicating the operation timing of the first smoothing section 114, the outline vector counter section 115, and the second smoothing section 116 as a whole. Reference symbol C denotes a timing signal indicating the operation timing of the binary image reproduction section 117. FIG. 7 shows the timings of the signals A, B, and C along the time base on the abscissa. Referring to FIG. 7, the signals A, B, and C are generated at timings corresponding to 307, 308, and 309 in FIG. 7. Each signal has two states, i.e., High and Low levels. When the signal is at High level, the corresponding section operates; when the signal is at Low level, the section stops.

Referring back to FIG. 6, reference numeral 301 denotes a delay device for receiving the above-mentioned signals A, B, and C. The delay device 301 generates the timing at which the signal C of the above-mentioned timing signals changes to Low level, i.e., an End trigger.

Reference numeral 302 denotes a timer circuit which starts the measurement of time in response to an input Start trigger, and stops the measurement in response to an End trigger. The measured time is supplied to a comparator 304 via a data bus 305. Note that the Start trigger indicates the timing at which the above-mentioned signal A changes from Low level to High level, and the End trigger indicates the timing at which the above-mentioned timing signal C changes from High level to Low level. The time period defined between the Start and End triggers corresponds to the time required for processing one image block in the outline smoothing processing section 110 shown in FIG. 2.

Reference numeral 303 denotes a latch which outputs a preset reference value in response to the input End trigger. Note that this reference value is set by calculating a value in consideration of the operation speed of the external output device connected. The output from the latch 303 is supplied to the comparator 304 via a data bus 306.

The comparator 304 compares the measured value in the timer circuit 302 with that output from the latch 303. When the measured value is equal to or larger than the reference value, the comparator 304 generates a signal. This signal is output as a detection signal from the monitoring section 119 shown in FIG. 2.

Note that the timer circuit 302 is not limited to a conventional timer circuit. For example, the timer circuit 302 may comprise a known up-counter to count the processing clocks of an image, thus realizing the same function with a simple arrangement.

<Another Embodiment>

The object of the present invention can also be achieved in such a manner that a storage medium which stores the program code shown in the above-mentioned flow chart is supplied to a system or apparatus, and a computer (CPU or the like) of the system or apparatus reads out and executes the program code stored in the storage medium, as a matter of course. In this case, the program code itself read out from the storage medium achieves the new function of the present invention, and the storage medium that stores the program code constitutes the present invention. As the storage medium for supplying the program code, for example, a floppy disk, a hard disk, an optical disk, a magneto-optical disk, a CD-ROM, a magnetic tape, a nonvolatile memory card, a ROM, and the like may be used.

Figure 8:
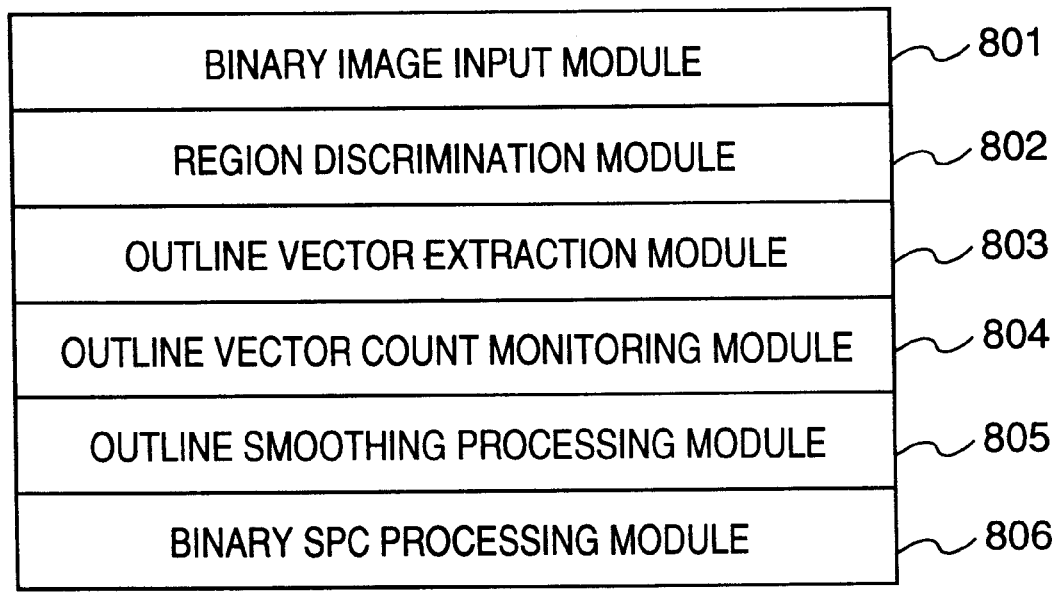
FIG. 8 is a table showing the features of the architecture of a processing program in still another embodiment of the present invention.

The feature of the architecture of the program according to the present invention is as shown in FIG. 8. The respective modules in FIG. 8 correspond to the steps in the flow chart shown in FIG. 4.

The function of the above embodiment is realized not only when the computer executes the readout program code but also by some or all of actual processing operations performed by an OS or the like which is running on the computer.

As described above, according to the present invention, a storage section having a large memory capacity need not be prepared for a complicated image with a large outline vector amount to be extracted. Therefore, the memory serving as the storage section can be integrated on an LSI, and can provide an economical advantage.

Since output data of outline vector extraction in the outline smoothing processing can be temporarily stored and held, the outline smoothing processing can be realized by pipeline processing.

Since the outline vector extraction section and the first smoothing section used in the outline smoothing processing can be operated independently, i.e., asynchronously, the outline smoothing processing can be realized by pipeline processing.

When outline vector data obtained as a result of the outline vector extraction section in the outline smoothing processing is stored and held in the storage section, an empty space of the storage section can be detected.

When outline vector data obtained as a result of the outline vector extraction section in the outline smoothing processing is stored and held in the storage section, the storage section can be prevented from becoming full of data, and hence, suspension of the subsequent image processing can be prevented.

The state of the storage section can be easily recognized by a simple arrangement for counting the number of outline vector data output from the outline vector output section in the outline smoothing processing.

The monitoring section can be easily constituted without requiring any complicated arrangement.

When the storage section becomes full of data and can no longer store and hold outline vector data, the processing of the outline vector extraction section in the outline smoothing processing is suspended, and an operation for the next image block can be started without requiring any extra operation.

Since another resolution conversion method is applied in place of the suspended outline smoothing processing, the resolution conversion of an image can be completed without being suspended.

When the outline smoothing processing is suspended, since the binary SPC section for executing processing in units of pixels is used as another resolution conversion section in place of the outline smoothing processing section, another work memory is not required, resulting in low cost.

When an external output device with a high processing speed is used as an image output device, an image output error caused by the delay time of the outline smoothing processing can be prevented.

Since a simple section such as a timer circuit is added to the monitor section to measure the time required for the outline smoothing processing, the suspension timing of the outline smoothing processing and the switching timing to another resolution conversion processing can be easily detected.

When the time required for the outline smoothing processing exceeds a predetermined time, the outline smoothing processing is suspended, and another resolution conversion processing can be applied instead. Furthermore, the outline smoothing processing can be performed for the next image block, thus attaining high-speed image processing.

When the time required for the outline smoothing processing exceeds a predetermined time, since the outline smoothing processing is suspended, and another resolution conversion processing is applied instead, the resolution conversion of an image can be completed without being suspended.

When the time required for the outline smoothing processing exceeds a predetermined time, since the outline smoothing processing is suspended, and the binary SPC section for executing processing in units of pixels is used as another resolution conversion section in place of the outline smoothing section, another work memory is not required, resulting in low cost.

The invention according to the present application can further reduce the memory capacity required for the apparatus and can realize pipeline processing since it allows processing in units of image blocks each constituted in units of lines of an image in the processing of a high-image quality resolution conversion device utilizing the outline smoothing processing. As a result, higher-speed image processing can be realized.

Note that the apparatus of the above embodiment can also be applied to a facsimile apparatus (which generates a binary image by executing the above-mentioned processing on the basis of a received image, or transmits vector data extracted from a read binary image).

The present invention may be applied to either a system constituted by a plurality of devices such as a host computer, interface, printer, and the like, or an apparatus consisting of a single device such as a copying machine.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which performs magnification processing on image data, block by block, the blocks being a part of the image data, said apparatus comprising:

extraction means for extracting outline vector data from a block of the image data;

determination means for determining whether or not extraction of the vector data by said extraction means is possible;

output means, when said determination means determines that the extraction of the vector data is not possible, for magnifying all the image data in the block without extracting the outline vector data and outputting the magnified image data, and when said determination means determines that the extraction of the vector data is possible, magnifying the vector data extracted by said extraction means, reproducing the image data from the magnified vector data and outputting the reproduced image data.

2. An apparatus according to claim 1, further comprising:
second determination means for determining a character/line image region in the block of image data,
wherein when said determination means determines that the extraction of the vector data is possible, for the character/line image region determined by said second determination means, said output means magnifies the extracted vector data, reproduces image data from the magnified vector data and outputs the reproduced image data, and for other regions, said output means magnifies the image data of the block without extracting outline vector data and outputs the magnified image data.

3. An apparatus according to claim 1, wherein said determination means determines whether or not the extraction of the vector data is possible by determining whether or not an amount of the extracted vector exceeds a predetermined value.

4. An apparatus according to claim 2, further comprising change means for changing the predetermined value.

5. An apparatus according to claim 1, wherein said determination means determines whether or not the extraction of the vector data is possible by determining whether or not an amount of the processing time exceeds a predetermined value.

6. An apparatus according to claim 1, further comprising:
selection means for selecting data output by said output means; and
print means for printing the output data selected by said selection means.

7. An apparatus according to claim 1, further comprising:
selection means for selecting data output by said output means; and
display means for displaying the output data selected by said selection means.

8. An apparatus according to claim 1, further comprising input means for inputting image data.

9. An image processing method for performing magnification processing on an image data, block by block, the block being a part of the image data, said method comprising the steps of:

determining whether or not extraction of vector data from a block is possible;

when it is determined that the extraction of the vector data is not possible, magnifying all the image data of the block without extracting the outline vector data from the block and outputting the magnified image data; and when it is determined that the extraction of the vector data is possible, extracting an outline vector data from the block, magnifying the vector data, reproducing the image data from the magnified vector data and outputting the reproduced image data.

10. A method according to claim 9 further comprising a second determining step of determining a character/line image region in the block of image data,
wherein when it is determined that the extraction of the vector data is possible in said determining step, for a character/line image region determined in said second determining step, the vector data extracted in said extracting step is magnified, image data is reproduced from the magnified vector data and the reproduced image data is output in said outputting step, and for other regions, the image data of the block is magnified without extracting outline vector data and the magnified image data is output in said outputting step.

11. A method according to claim 9, wherein whether or not the processing of the vector data is possible is determined based on whether or not an amount of the extracted vector exceeds a predetermined value.

12. A method according to claim 10, further comprising a changing step of changing the predetermined value.

13. A method according to claim 9, wherein whether or not the processing of the vector data is possible is determined based on whether or not an amount of the processing time exceeds a predetermined value.

14. A method according to claim 9, further comprising the steps of:

selecting data output in said output step; and printing the output data selected in said selecting step.

15. A method according to claim 9, further comprising the steps of:

selecting data output in said output step; and displaying the output data selected in said selecting step.

16. A method according to claim 9, further comprising the step of inputting image data.

* * * * *